US012548426B2

(12) United States Patent
Bohme et al.

(10) Patent No.: US 12,548,426 B2
(45) Date of Patent: Feb. 10, 2026

(54) CROSSING GATE MECHANISM WITH INTEGRATED MAINTENANCE STATUS ALARM

(71) Applicant: Siemens Mobility, Inc., New York, NY (US)

(72) Inventors: Richard C. Bohme, Louisville, KY (US); James Dobson, Louisville, KY (US)

(73) Assignee: Siemens Mobility, Inc., New York, NY (US)

( * ) Notice: Subject to any disclaimer, the term of this patent is extended or adjusted under 35 U.S.C. 154(b) by 544 days.

(21) Appl. No.: 18/064,965

(22) Filed: Dec. 13, 2022

(65) Prior Publication Data

US 2024/0194047 A1 Jun. 13, 2024

(51) Int. Cl.

*G08B 21/18* (2006.01)
*B61L 29/22* (2006.01)
*G08B 3/10* (2006.01)

(52) U.S. Cl.

CPC .............. *G08B 21/18* (2013.01); *B61L 29/22* (2013.01); *G08B 3/10* (2013.01)

(58) Field of Classification Search

CPC .............. G08B 2/18; G08B 3/10; B61L 29/22
See application file for complete search history.

(56) References Cited

U.S. PATENT DOCUMENTS

| | | | | | |
|---|---|---|---|---|---|
| 1,560,085 | A * | 11/1925 | Harvey | B61L 29/226 | 246/128 |
| 5,022,613 | A * | 6/1991 | Peel | H05B 41/34 | 315/86 |
| 6,480,109 | B1 * | 11/2002 | Tice | G08B 29/22 | 340/517 |
| 7,049,914 | B2 * | 5/2006 | Lamb | E05B 81/66 | 335/207 |
| 10,148,760 | B2 * | 12/2018 | Barragan | B61L 29/30 | |
| 10,507,854 | B2 * | 12/2019 | DeJarnatt | B61L 29/24 | |
| 10,589,766 | B2 * | 3/2020 | Wydotis | B61L 29/288 | |
| 10,899,374 | B2 * | 1/2021 | Hilleary | G08G 1/07 | |
| 11,021,180 | B2 * | 6/2021 | Harp | B61L 29/284 | |
| 11,420,663 | B2 * | 8/2022 | Wydotis | B61L 29/22 | |
| 11,827,260 | B2 * | 11/2023 | Corbo | B61L 1/187 | |

(Continued)

FOREIGN PATENT DOCUMENTS

| | | | | |
|---|---|---|---|---|
| HR | P980479 B1 * | 8/2002 | B61L 29/22 |
| JP | 2003040111 A * | 2/2003 | |

(Continued)

*Primary Examiner* — Jason C Smith

(57) ABSTRACT

A crossing gate mechanism includes an enclosure housing multiple electric and electronic components including a control unit for operating the crossing gate mechanism and associated crossing gate arm, a cover for opening and closing the enclosure, wherein the cover is moveable between a closed position and an open position, an operating mode switch, wherein a first position of the operating mode switch is associated with a normal operating mode and a second position of the operating mode switch is associated with a maintenance mode, and a status alarm circuit, wherein the status alarm circuit for issuing an alarm when the operating mode switch is in the second position associated with the maintenance mode and the cover is in or moved into the closed position.

14 Claims, 5 Drawing Sheets

(56) References Cited

U.S. PATENT DOCUMENTS

| | | | | |
|---|---|---|---|---|
| 2002/0145083 | A1* | 10/2002 | Zander | A63H 19/34 246/293 |
| 2005/0284987 | A1* | 12/2005 | Kande | B61L 29/16 246/125 |
| 2017/0274917 | A1* | 9/2017 | Worthey, Sr. | B61L 23/041 |
| 2023/0050879 | A1* | 2/2023 | Patel | B61L 29/243 |
| 2024/0194047 | A1* | 6/2024 | Bohme | B61L 29/30 |

FOREIGN PATENT DOCUMENTS

| | | | | |
|---|---|---|---|---|
| JP | 2021142797 | A | * | 9/2021 |
| JP | 7436232 | B2 | * | 2/2024 |
| RU | 2528513 | C2 | * | 9/2014 |

* cited by examiner

CROSSING GATE MECHANISM WITH INTEGRATED MAINTENANCE STATUS ALARM

BACKGROUND

1. Field

Aspects of the present disclosure generally relate to railroad crossing gates and crossing gate mechanisms, more particularly, to a crossing gate mechanism with an integrated maintenance status alarm in combination with a cover or door detection scheme.

2. Description of the Related Art

A railway crossing, also referred to as level crossing or grade crossing, is an intersection where a railway line crosses a road or path. To ensure safety of railway crossings, crossing control systems including signal control equipment are installed at railway crossings. Railroad signal control equipment includes for example a constant warning time device, also referred to as a grade crossing predictor (GCP) in the U.S. or a level crossing predictor in the U.K., which is an electronic device that is connected to rails of a railroad track and is configured to detect the presence of an approaching train and determine its speed and distance from a crossing, i.e., a location at which the tracks cross a road, sidewalk or other surface used by moving objects. The constant warning time device will use this information to generate a constant warning time signal for a crossing warning device.

A crossing warning device is a device that warns of the approach of a train at a crossing, examples of which include crossing gate arms, crossing lights (such as the red flashing lights often found at highway grade crossings in conjunction with the crossing gate arms), and/or crossing bells or other audio alarm devices. Constant warning time devices are typically configured to activate the crossing warning device (s) at a fixed time, also referred to as warning time (WT), which can be for example 30 seconds, prior to the approaching train arriving at the crossing.

Railroad crossing gates utilize electrical and mechanical components to ensure that the crossing gates perform their intended functions correctly. For example, gate arms are lowered using a motor located in a crossing gate mechanism, herein also referred to as gate control mechanism. A crossing gate mechanism may be described as gate control box housing multiple electric and electronic components for operating and controlling the signal control equipment and warning devices, such as the crossing gates. Typically, the gate control box includes a housing with a cover or door, so that the control box may be opened for maintenance or other services.

SUMMARY

Briefly described, aspects of the present disclosure generally relate to railroad crossing gates and, more particularly to a crossing gate mechanism with an integrated status alarm circuit in combination with a cover or door detection functionality.

A first aspect of the present disclosure provides a crossing gate mechanism comprising an enclosure housing multiple electric and electronic components including a control unit configured to operate the crossing gate mechanism and associated crossing gate arm, a cover for opening and closing the enclosure, wherein the cover is moveable between a closed position and an open position, an operating mode switch, wherein a first position of the operating mode switch is associated with a normal operating mode and a second position of the operating mode switch is associated with a maintenance mode, and a status alarm circuit, wherein the status alarm circuit is configured to issue an alarm when the operating mode switch is in the second position associated with the maintenance mode and the cover is in or moved into the closed position.

A second aspect of the present disclosure provides a method for generating a status alarm of a crossing gate mechanism, the method comprising generating and issuing a status alarm when an operating mode switch is in a position associated with a maintenance mode of the crossing gate mechanism, and when a cover of the crossing gate mechanism is in a closed position.

A third aspect of the present disclosure provides a crossing gate system comprising one or more crossing gate arm(s), and a crossing gate mechanism as described herein.

DETAILED DESCRIPTION

To facilitate an understanding of embodiments, principles, and features of the present disclosure, they are explained hereinafter with reference to implementation in illustrative embodiments. In particular, they are described in the context of a crossing gate mechanism utilized in connection with railroad crossing gate applications.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Figure 1:
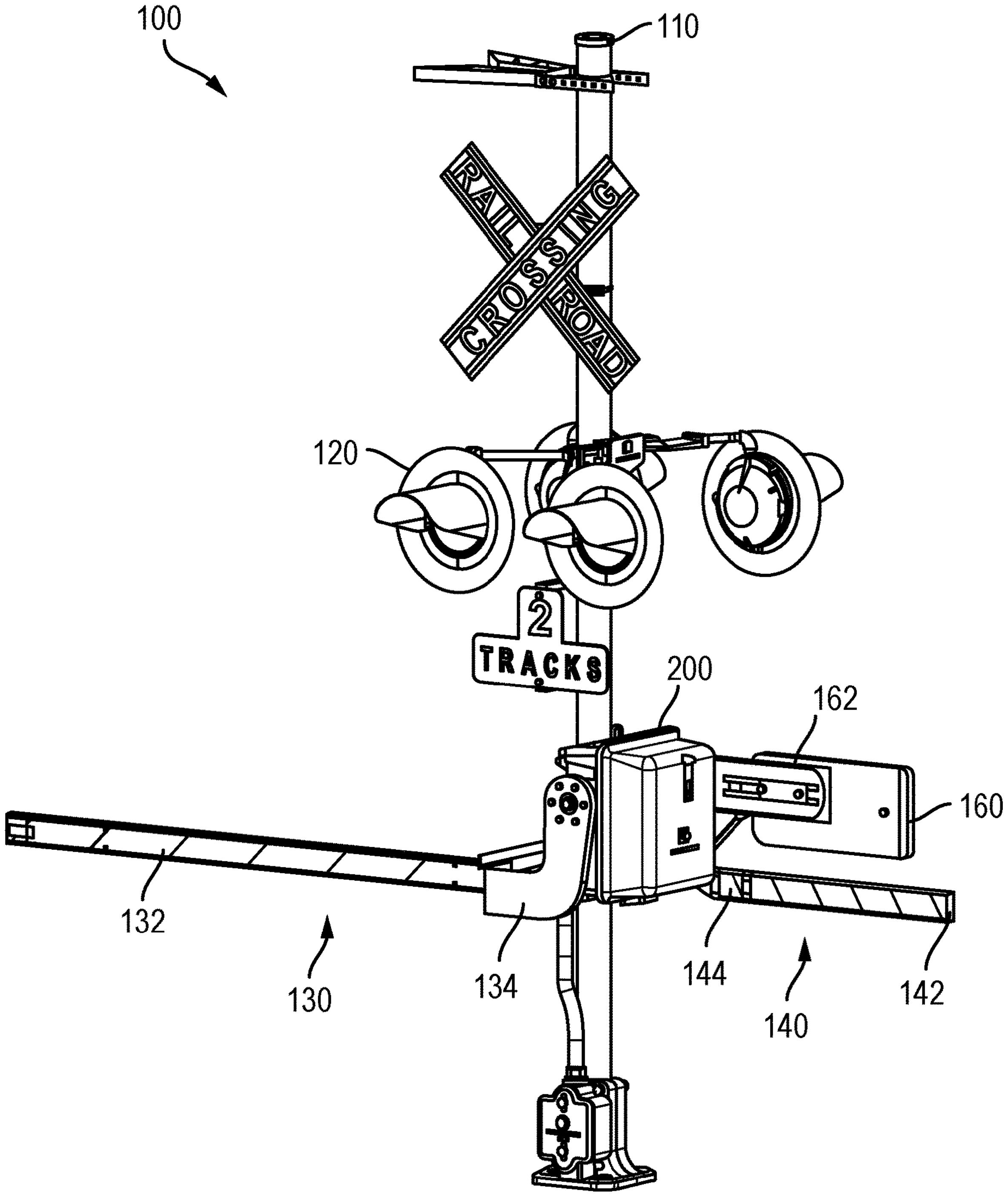
FIG. 1 illustrates an example railroad crossing gate in accordance with an exemplary embodiment of the present disclosure.

FIG. 1 illustrates a railroad crossing gate 100 in a lowered or horizontal position. At many railroad crossings, at least one railroad crossing gate 100 may be placed on either side of the railroad track to restrict roadway traffic in both directions. At some crossings, pedestrian paths or sidewalks may run parallel to the roadway. To restrict road and sidewalk traffic, the illustrated railroad crossing gate 100 includes a separate roadway gate 130 and pedestrian gate 140. The roadway gate 130 and pedestrian gate 140 may be raised and lowered, i.e. operated, by control mechanism 200.

The example railroad crossing gate 100 also includes a pole 110 and signal lights 120. The gate control mechanism 200 is attached to the pole 110 and is used to raise and lower the roadway and pedestrian gates 130, 140. The illustrated railroad crossing gate 100 is often referred to as a combined crossing gate. When a train approaches the crossing, the railroad crossing gate 100 may provide a visual warning using the signal lights 120. The gate control mechanism 200 will lower the roadway gate 130 and the pedestrian gate 140 to respectively restrict traffic and pedestrians from crossing the track until the train has passed.

As shown in FIG. 1, the roadway gate 130 comprises a roadway gate support arm 134 that attaches a roadway gate arm 132 to the gate control mechanism 200. Similarly, the pedestrian gate 140 comprises a pedestrian gate support arm 144 connecting a pedestrian gate arm 142 to the gate control mechanism 200. When raised, the gates 130 and 140 are positioned so that they do not interfere with either roadway or pedestrian traffic. This position is often referred to as the vertical position. A counterweight 160 is connected to a counterweight support arm 162 connected to the gate control mechanism 200 to counterbalance the roadway gate arm 132. Although not shown, a long counterweight support arm could be provided in place of the short counterweight support arm 134.

Typically, the gates 130, 140 are lowered from the vertical position using an electric motor contained within the gate control mechanism 200. The electric motor drives gearing connected to shafts (not shown) connected to the roadway gate support arm 134 and pedestrian gate support arm 144. The support arms 134, 144 are usually driven part of the way down by the motor (e.g., somewhere between 70 and 45 degrees) and then gravity and momentum are allowed to bring the arms 132, 142 and the support arms 134, 144 to the horizontal position. In another example, the support arms 134, 144 are driven all the way down to the horizontal position by the electric motor of the gate control mechanism 200.

Figure 2:
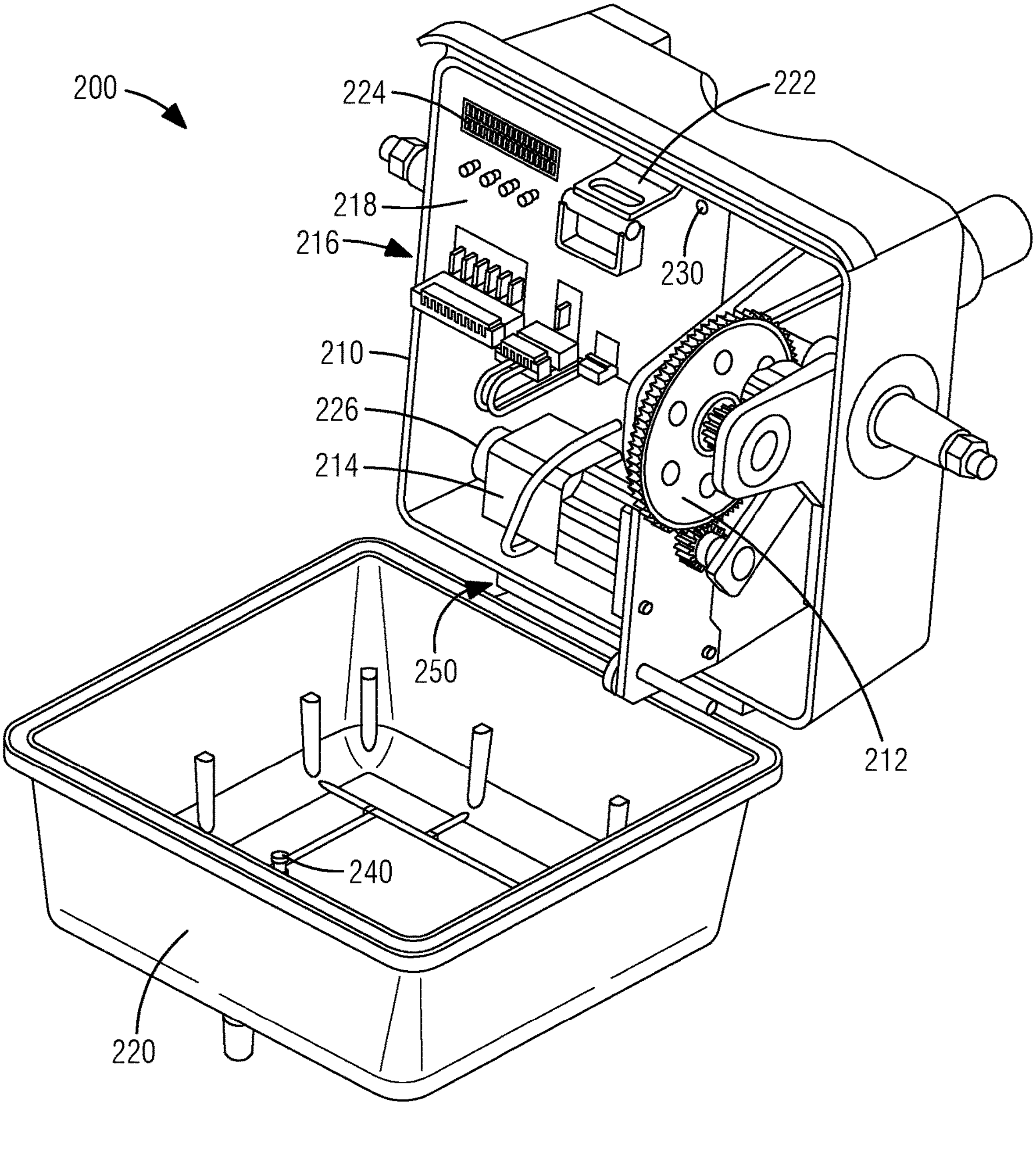
FIG. 2 illustrates a perspective view of a crossing gate mechanism in accordance with an exemplary embodiment of the present disclosure.

FIG. 2 illustrates a perspective view of crossing gate mechanism 200 in accordance with an exemplary embodiment of the present disclosure.

The crossing gate mechanism 200 comprises an enclosure 210 housing multiple electric and electronic components, such as for example gearing 212, electric motor 214 driving the gearing 212, electric brake 226 and control unit 216. The control unit 216 comprises a printed circuit board (PCB) 218 with the necessary electronics for operating and controlling the gate mechanism 200 and associated crossing gate equipment, such as crossing gate arm(s), see for example FIG. 1. Further, the PCB 218 comprises for example display(s) 224 and/or light emitting diodes (LEDs), used for example to indicate or display status of the gate mechanism 200, such status including for example ‘Power on’, ‘Gate Request’, ‘Brake On’, ‘Health’ etc.

The enclosure 210 can be opened and closed via door or cover 220, for maintenance, repair, or other services. The cover 220 is moveable between a closed position and an open position, wherein FIG. 2 shows the cover 220 in the open position. The cover 220 is closed via hinge 250 and latch plate 222 in connection with a latch rod (not shown).

Further, the crossing gate mechanism 200 comprises a cover detection feature or function that provides feedback with respect to the cover 220, specifically when the cover 220 is in the closed position. One of the multiple components positioned in the enclosure 210 is at least one sensing device 230, and the cover 220 comprises a detectable device 240. The detectable device 240 is arranged in the cover 220 such that, when the cover 220 is moved into the closed position, the detectable device 240 comes in proximity to the at least one sensing device 230, which is then activated and configured to indicate that the cover 220 is in the closed position.

In an embodiment, the combination of the at least one sensing device 230 and detectable device 240 operate based on a magnetic field principle. The at least one sensing device 230 detects presence of a magnetic field. The at least one sensing device 230 comprises one or more sensor(s), for example Hall sensor(s), specifically a Hall sensor array. The detectable device 240 comprises a magnetized area with a magnetic field detectable by the at least one sensing device 230, such as the Hall sensor array. The at least one sensing device 230 may be arranged on the PCB 218. However, it should be noted that the at least one sensing device 230, for example Hall sensor array, may not be arranged on the PCB 218, but in another location within the enclosure 210 of the crossing gate mechanism 200. The detectable device 240, herein also referred to as magnetized device 240, can be configured as a bolt or pin, for example a magnetized bolt or pin. In an embodiment, the magnetized device 240 comprises a magnetized area in a head of the bolt or pin.

In other embodiments, the at least one sensing device 230 and detectable device 240 may not operate based on the magnetic field principle, but on different principles or modes. For example, the two devices 230, 240 may function together based on electrical or mechanical principles. The detectable device 240 provides a certain output or characteristic which is detectable or measurable by the at least one sensing device 230.

Figure 3:
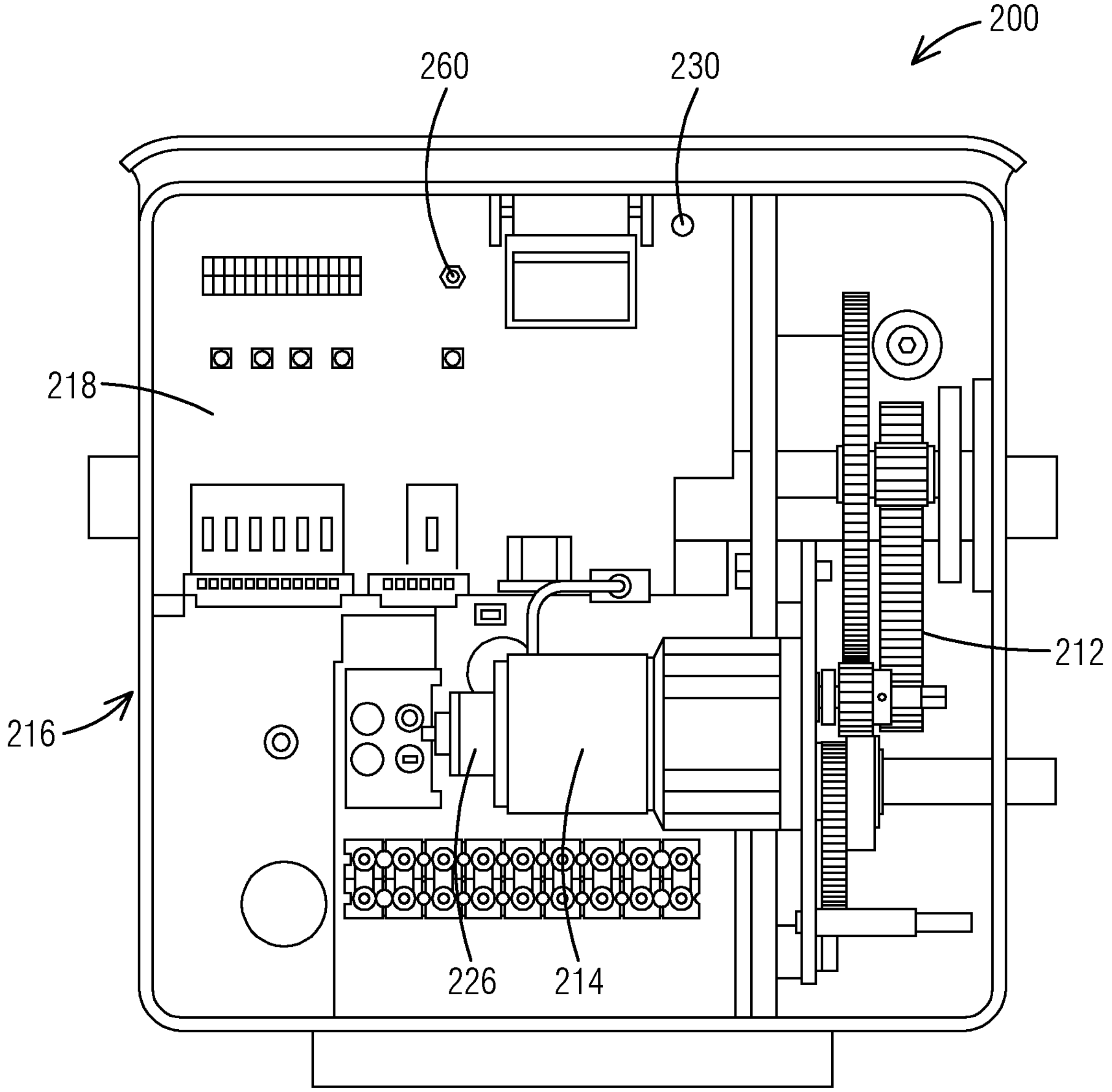
FIG. 3 illustrates a front view of a crossing gate mechanism in accordance with an exemplary embodiment of the present disclosure.
Figure 4:
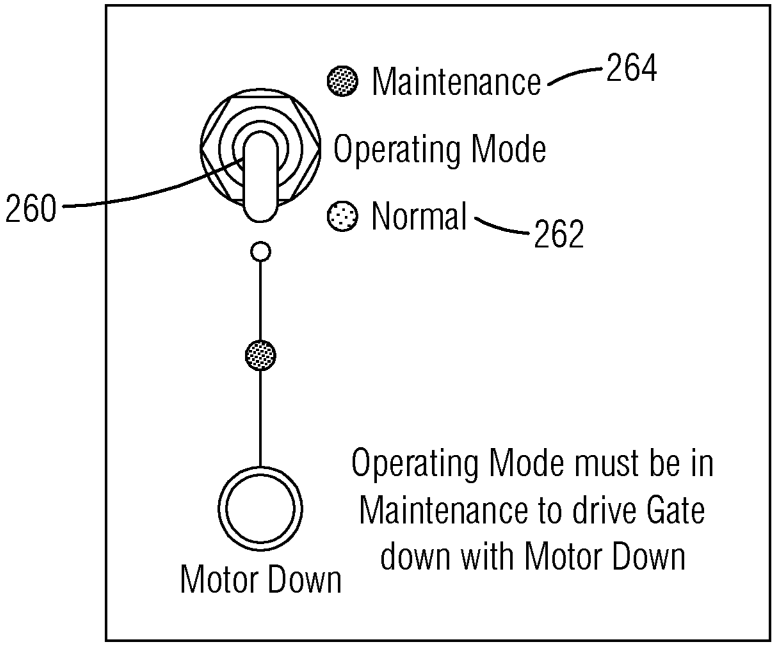
FIG. 4 illustrates a section of a front view of a crossing gate mechanism in accordance with an exemplary embodiment of the present disclosure.

FIG. 3 illustrates a front view of a crossing gate mechanism, and FIG. 4 illustrates a section of the front view in accordance with an exemplary embodiment of the present disclosure.

As described earlier with reference to FIG. 2, the crossing gate mechanism 200 houses multiple electric and electronic components, such as for example gearing 212, electric motor 214, electric brake 226 and control unit 216. The control unit 216 comprises a PCB 218 with the necessary electronics for operating and controlling the gate mechanism 200 and associated crossing gate equipment.

Further, the crossing gate mechanism 200 comprises the at least one sensing device 230, arranged on the PCB 218. A detectable device 240, see FIG. 2, is arranged in the cover 220 such that, when the cover 220 is moved into the closed position, the detectable device 240 comes in proximity to the at least one sensing device 230. The at least one sensing device 230, with an associated electronic circuit, generate a signal that the cover 220 is in the closed position.

With reference to FIG. 3 and FIG. 4, the gate mechanism 200 comprises operating mode switch 260. In an example, the operating mode switch 260 is configured as a toggle switch that can be flipped/switched between a first operating mode ‘NORMAL’ and a second operating mode ‘MAINTENANCE’. In other words, a first position of the operating mode switch 260 is associated with a normal operating mode 262 and a second position of the operating mode switch 260 is associated with a maintenance mode 264 (see specifically FIG. 4).

In an example, to perform maintenance of the crossing gate and associated equipment, personnel will open the gate mechanism 200 and put the crossing gate into maintenance mode 264, by flipping the switch 260 into the second position. Prior to operating the switch 260, the gate arm is held in vertical position by the electric brake 226. After the switch 260 is put into maintenance mode 264, gate control is disabled (not able to lower the gate by the crossing controller), the electric brake 226 is released, and the electric motor 214 is now holding the gate arm in the vertical position. The maintenance mode 264 enables the gate mechanism 200 to be driven down if the gate arm must be reinstalled and other various activities.

Currently, there is no functionality that indicates or prevents that the operating mode switch 260 is left in the maintenance mode 264 and the gate mechanism 200 is closed, via cover/door 220, when in fact maintenance has been completed and the gate mechanism 200 should operate in normal mode 262. If the operating mode switch 260 is left in maintenance mode 264 (i.e. in the wrong mode) the crossing gate would not operate correctly, in particular when needed due to an approaching train.

Figure 5:
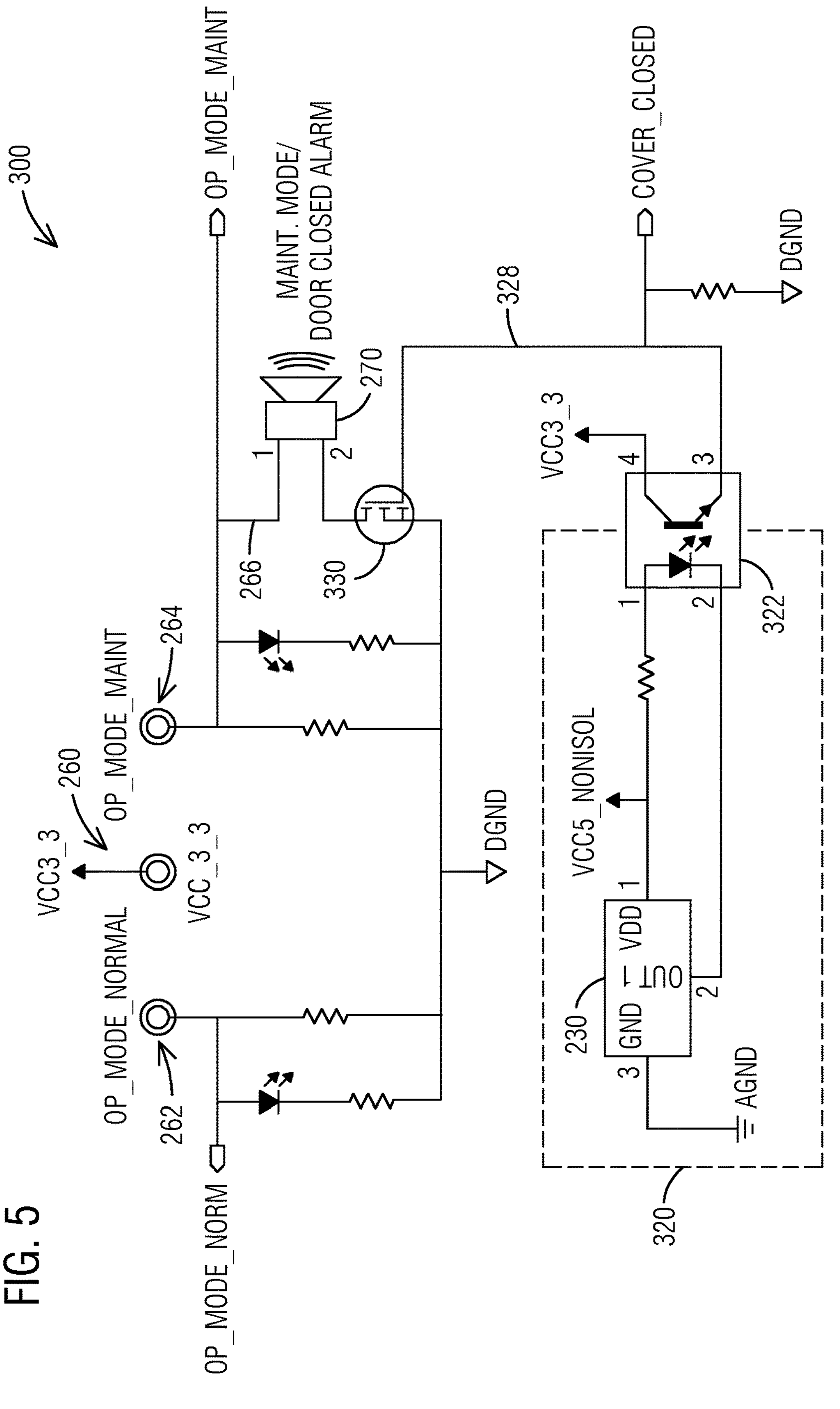
FIG. 5 illustrates a schematic diagram of a status alarm circuit of a crossing gate mechanism in accordance with an exemplary embodiment of the present disclosure.

FIG. 5 illustrates a schematic diagram of a status alarm circuit 300 of a crossing gate mechanism in accordance with an exemplary embodiment of the present disclosure.

In an exemplary embodiment of the present disclosure, a crossing gate mechanism, such as for example crossing gate mechanism 200 as illustrated in FIG. 2 and FIG. 3, comprises a functionality that indicates and provides an alert or alarm when the operating mode switch 260 is left in maintenance mode 264 and the cover 220 of the gate mechanism 200 closed, when in fact the switch 260 should be in normal mode 262 because maintenance has been completed. In other words, maintenance personnel may forget to flip the switch 260 back to normal mode 262 which creates a safety hazard, because the crossing gate does not function correctly.

The crossing gate mechanism comprises a status alarm circuit 300, wherein the status alarm circuit 300 is configured to issue an alarm or alert when the operating mode switch 260 is in the second position associated with the maintenance mode 264 and the cover 220 is in the closed position. The status alarm circuit 300, herein shortly referred to as alarm circuit 300, is coupled to door or cover sensor circuit 320, herein shortly referred to as sensor circuit 320. Specifically, the sensor circuit 320 is arranged in parallel and provides input to the alarm circuit 300. In an embodiment, the alarm circuit 300 as well as the sensing circuit 320 are arranged on the PCB 218 of the gate mechanism.

In an example, the sensor circuit 320 includes the sensing device 230, for example a Hall sensor or Hall sensor array, and electronic element 322 that transmits electrical signals from the sensing circuit 320, specifically the sensing device 230, to the alarm circuit 300. The electronic element 322 can be for example an optocoupler/photocoupler. When the cover 220 is in a closed position, the magnetized device 240 is near the sensing device 230, e.g. Hall sensor array, and a signal 328 is triggered that indicates that the cover 220 is closed. The signal 328 is transmitted to the alarm circuit 300. For example, transistor 330 of the alarm circuit 300 is activated when the signal 328 is present.

The alarm circuit 300 includes the operating mode switch 260 which can be switched between normal model 262 and maintenance mode 262. The alarm circuit 300 comprises multiple inputs and an output. A first input is based on the signal 328 from the sensing circuit 320 when the cover of the gate mechanism is in the closed position. A second input is based on signal 266 when the operating mode switch 260 is in the maintenance mode 264.

In an example, the output is adapted as an audio device 270, wherein, based on receiving the first input (signal 328) and the second input (signal 266), the audio device 270 is configured to issue the alarm. The audio device 270 can be for example a magnetic transducer or a piezoelectric device, emitting a sound. For example, device 270 can be piezoelectric buzzer. In order words, the alarm indicates to the personnel that something is wrong, i.e. the switch 260 was left in the wrong position, when the cover 220 was just brought into the closed position. If the switch 260 is in the correct position, i.e. normal operating mode 262, and the cover 220 is closed, the alarm circuit 300 is configured such that the alarm would not be triggered and not make a sound. It should be noted that the output, e.g. audio device 270, can be configured differently and not as audio output, but for example as a visual output or other type of output that is able to generate an alert or alarm to the personnel.

In another exemplary embodiment of the disclosure, a method for generating a status alarm of a crossing gate mechanism is provided. The method may be implement utilizing a gate mechanism 200 and alarm circuit 300 with sensing 320 as described herein, for example with reference to FIG. 3, FIG. 4 and FIG. 5. The method comprises generating and issuing a status alarm when an operating mode switch is in a position associated with a maintenance mode of the crossing gate mechanism, and when a cover of the crossing gate mechanism is in a closed position. More specifically, the method comprises transmitting a first signal when the cover is in the closed position, transmitting a second signal when the operating mode switch is in the position associated with the maintenance mode, and outputting an alarm sound based upon receipt of the first signal and the second signal. In an example, the alarm sound is generated and output by an audio device comprising a magnetic transducer or a piezoelectric device.

The invention claimed is:

1. A crossing gate mechanism comprising:

an enclosure housing multiple electric and electronic components including a control unit configured to operate the crossing gate mechanism and associated crossing gate arm, a cover for opening and closing the enclosure, wherein the cover is moveable between a closed position and an open position, an operating mode switch, wherein a first position of the operating mode switch is associated with a normal operating mode and a second position of the operating mode switch is associated with a maintenance mode, and a status alarm circuit, wherein the status alarm circuit is configured to issue an alarm when the operating mode switch is in the second position associated with the maintenance mode and the cover is in the closed position, wherein the enclosure houses at least one sensing device, wherein the cover comprises a detectable device, and wherein the detectable device is arranged in the cover such that, when the cover is moved into the closed position, the detectable device comes in proximity to the at least one sensing device, and the at least one sensing device is configured to generate a signal indicating that the cover is in the closed position.

2. The crossing gate mechanism of claim 1, wherein the status alarm circuit comprises multiple inputs and an output, wherein, when the cover is in the closed position, a first signal is transmitted as a first input, wherein, when the operating mode switch is in the second position associated with the maintenance mode, a second signal is transmitted as a second input, and wherein, based on receiving the first signal and the second signal, the output is configured to issue the alarm.

3. The crossing gate mechanism of claim 1, wherein the status alarm circuit comprises an audio device configured to emit an alarm sound.

4. The crossing gate mechanism of claim 3, wherein the audio device comprises a magnetic transducer or a piezoelectric device.

5. The crossing gate mechanism of claim 1, wherein the at least one sensing device detects presence of a magnetic field.

6. The crossing gate mechanism of claim 1, wherein the at least one sensing device comprises a Hall sensor array.

7. The crossing gate mechanism of claim 1, wherein the detectable device arranged in the cover comprises a magnetized bolt or pin.

8. The crossing gate mechanism of claim 1, wherein the control unit comprises a printed circuit board (PCB), and wherein the status alarm circuit and the at least one sensing device are arranged on the PCB.

9. The crossing gate mechanism of claim 1, wherein the operating mode switch comprises a toggle switch.

10. A method for generating a status alarm of a crossing gate mechanism, the method comprising:

transmitting a first signal when a cover of the crossing gate mechanism is in a closed position, wherein transmitting the first signal comprises detecting, via at least one sensing device housed in an enclosure of the crossing gate mechanism, a detectable device arranged in the cover when the detectable device comes in proximity to the at least one sensing device as the cover is moved into the closed position, transmitting a second signal when an operating mode switch is in a position associated with a maintenance mode of the crossing gate mechanism, and generating and issuing a status alarm based upon receipt of the first signal and the second signal when the operating mode switch is in the position associated with the maintenance mode of the crossing gate mechanism, and when a cover of the crossing gate mechanism is in the closed position.

11. The method of claim 10, further comprising:

outputting an alarm sound based upon receipt of the first signal and the second signal.

12. The method of claim 11, wherein alarm sound is output by an audio device comprising a magnetic transducer or a piezoelectric device.

13. A crossing gate system comprising:

one or more crossing gate arm(s), and a crossing gate mechanism comprising:

an enclosure housing multiple electric and electronic components including a control unit configured to operate the crossing gate mechanism and associated crossing gate arm, a cover for opening and closing the enclosure, wherein the cover is moveable between a closed position and an open position, an operating mode switch, wherein a first position of the operating mode switch is associated with a normal operating mode and a second position of the operating mode switch is associated with a maintenance mode, and a status alarm circuit, wherein the enclosure houses at least one sensing device, wherein the cover comprises a detectable device, wherein the detectable device is arranged in the cover such that, when the cover is moved into the closed position, the detectable device comes in proximity to the at least one sensing device, and the at least one sensing device is configured to generate a signal indicating that the cover is in the closed position, and wherein the status alarm circuit is configured to issue an alarm when the operating mode switch is in the second position associated with the maintenance mode and the cover is in the closed position.

14. The crossing gate system of claim 13, wherein the status alarm circuit comprises an audio device configured to emit an alarm sound, the audio device including a magnetic transducer or a piezoelectric device.

* * * * *